United States Patent
Reed et al.

(10) Patent No.: US 7,496,500 B2
(45) Date of Patent: Feb. 24, 2009

(54) SYSTEMS AND METHODS THAT DETERMINE INTENT OF DATA AND RESPOND TO THE DATA BASED ON THE INTENT

(75) Inventors: David R. Reed, Seattle, WA (US); Eric K. Ringger, Issaquah, WA (US); Michael Gamon, Seattle, WA (US); Richard G. Campbell, Redmond, WA (US); Robert G. Atkinson, Woodinville, WA (US); Simon H. Corston, Seattle, WA (US); Malcolm E. Pearson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 10/867,626

(22) Filed: Jun. 15, 2004

(65) Prior Publication Data

US 2005/0192992 A1    Sep. 1, 2005

Related U.S. Application Data

(60) Provisional application No. 60/549,075, filed on Mar. 1, 2004.

(51) Int. Cl.
    *G06F 17/27* (2006.01)
    *G06F 15/16* (2006.01)
    *G06F 15/173* (2006.01)

(52) U.S. Cl. .................... 704/9; 704/270; 709/206; 709/240

(58) Field of Classification Search ............... None
    See application file for complete search history.

(56) References Cited

U.S. PATENT DOCUMENTS

| | | | |
|---|---|---|---|
| 5,077,666 A * | 12/1991 | Brimm et al. | 705/2 |
| 6,161,130 A * | 12/2000 | Horvitz et al. | 709/206 |
| 6,411,924 B1 * | 6/2002 | de Hita et al. | 704/9 |
| 6,453,327 B1 * | 9/2002 | Nielsen | 715/500 |
| 6,499,013 B1 * | 12/2002 | Weber | 704/257 |
| 6,829,613 B1 * | 12/2004 | Liddy | 707/10 |
| 2002/0013692 A1 * | 1/2002 | Chandhok et al. | 704/1 |
| 2002/0103647 A1 * | 8/2002 | Houplain | 704/260 |
| 2004/0006473 A1 * | 1/2004 | Mills et al. | 704/270 |
| 2004/0117188 A1 * | 6/2004 | Kiecza et al. | 704/270.1 |

* cited by examiner

*Primary Examiner*—David R Hudspeth
*Assistant Examiner*—Matthew J Sked
(74) *Attorney, Agent, or Firm*—Amin, Turocy & Calvin, LLP

(57) ABSTRACT

The present invention relates to systems and methods that determine intent for received data (e.g., email, voice, graphics . . . ) and respond to the data based on the intent. The systems and methods employ various combinations of features based on shallow and deep linguistic analysis (e.g., semantic and syntactic) to yield very high accuracy. The systems and methods analyze and categorize received data to locate data that can include intent. This data can be further refined by extracting features related to the intent. The features can be utilized by a classifier to determine the intent. If the intent warrants a response, the data are further scrutinized and reformulated to generate a description that is indicative of the intent. The reformulation can include representing the features in a logical form, transforming the form and generating a description of the intent that can be presented to a user visually and/or audibly.

39 Claims, 14 Drawing Sheets

Tasks

- [ ] Schedule our first naive subjects on 8/15.
- [ ] Plan some time for Mary to get re-synchronized with the console before the first subject arrives.
- [ ] Copy & paste into wiz console fields.
- [ ] "Dispatch" button not working for "contacts".
- [ ] End recording of message automatically when tab is switched.
- [ ] Change text when confirming the sending of a message.
- [ ] Kill that darned beep.
- [x] Cook up additional PST's based on scenarios.
- [x] Arrange for rooms/set up equipment.
- [ ] Organize some kind of compensation.

User selection

Populate Tasklist →

Tasks

| | Subject | Due Date |
|---|---|---|
| | Click here to add a new Task | |
| | Arrange for rooms/set up equipment. | None |
| | Cook up additional PST's based on scenarios. | None |

FIG. 11

SYSTEMS AND METHODS THAT DETERMINE INTENT OF DATA AND RESPOND TO THE DATA BASED ON THE INTENT

CROSS-REFERENCE TO RELATED APPLICATION(S)

This application claims the benefit of U.S. Provisional Patent Application Ser. No. 60/549,075 filed on Mar. 1, 2004, and entitled "SYSTEMS AND METHODS FOR DETERMINING, INFERRING, OR PREDICTING INTENT OF AN ITEM HAVING CONTENT," the entirety of which is incorporated herein by reference.

TECHNICAL FIELD

The present invention relates generally to computer systems, and more particularly to systems and methods that receive one or more sets of data, analyze the data to determine a corresponding intent, and perform an action based on the intent.

BACKGROUND OF THE INVENTION

With the growth of computer and information systems and related network technologies such as wireless and Internet communications, ever increasing amounts of electronic information are communicated, transferred and subsequently processed by users and/or systems. As an example, electronic mail programs have become a popular application among computer users for generating and receiving such information. With the advent of the Internet, for example, exchanging e-mail has become an important factor influencing why many people acquire computers. Within many corporate environments, e-mail has become almost a de facto standard by which coworkers exchange information. However, with the heightened popularity of e-mail and other information transfer systems, problems have begun to appear in regard to managing and processing increasing amounts of information from a plurality of sources.

Among these problems, many users now face a deluge of e-mail and/or other information from which to sort through and/or respond, such that the capability of being able to send, receive and process information has almost become a hindrance to being productive. For example, some users report receiving over 100 e-mail messages a day. With such large numbers of e-mail and other electronic information, it has thus become difficult to manage information according to what is important and what is not as important without substantially expending valuable time to make a personal determination as to the importance. As an example of these determinations, users may have to decide whether messages should be responded to immediately, passed over to be read at a later time, or simply deleted due to non-importance (e.g., junk mail).

Attempts have been directed at resolving information management problems. For example, attempts have been made to curtail the amount of junk or promotional e-mail (e.g., spam) that users receive. Additionally, some electronic mail programs provide for the generation of rules that govern how e-mail is managed within the program. For example, a rule providing, "all e-mails from addresses" are to be placed in a special folder. Such attempts generally are not directed at the basic problem behind e-mail and other information transfer/reception systems. That is, conventional systems often cause users to manually peruse and check at least a portion of some if not all of their received messages in order to determine which messages should be reviewed or further processed. As described above, this takes time from more productive activities. Thus, with the large quantities of information being received, there is a need for a system and methodology to facilitate efficient processing of electronic information while mitigating the costs of manual interventions associated therewith.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods that respond to received data (e.g., email, voice, graphics . . . ) based on intent of the data. In general, the systems and methods analyze and categorize received data, extract the data related to intent and/or discard any data unrelated to intent, and determine the intent from this extracted set of data. If it is determined that the intent warrants a response, the data is further scrutinized and reformulated to generate a description that is indicative of the intent. Such description can be variously presented to a user, for example, visually and/or audibly. The novel systems and methods described herein employ various combinations of features based on shallow linguistic analysis (e.g., function word frequencies, part of speech trigrams . . . ) and deep linguistic analysis (e.g., context free grammar production frequencies and features derived from semantic graphs) to yield improved accuracy in attributing a short random text sample to a specific source.

In one aspect of the present invention, a system is provided that determines intent and generates actions and/or notifications based thereon. The system includes a data manager that can employ various techniques to determine an associated intent of the data. In one instance, the data manager utilizes information such as metadata, properties, content, context, keywords, history, heuristics, inferences, rules, demarcations, extrinsic information such the source of the data, the time of day and/or day of week the data was transmitted and/or received, cost/benefit of handling the data, etc. to group data into one or more sets of data with similar characteristics. The data manager can extract data related to the intent and/or discard data unrelated to the intent. The data indicative of the intent can be analyzed to determine whether to respond to the data. When it is determined that a response should be provided, respective data can be further refined, reformulated, and employed to generate a suitable response such as automatically performing an action and/or notifying a user, for example. The data manager can include various components such as an analyzer that performs an initial analysis of received data; a parser that separates the data into various groupings; an extractor the reduces the data to a set of data related to the intent; a classifier that generates the intent from the reduced set of data; a decision component (thresholder) that determines whether the intent warrants a response; and an action engine that performs related actions and/or notifies a user(s).

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 9 illustrates an exemplary graphical user interface that can be employed in accordance with an aspect of the present invention.

FIG. 10 illustrates an exemplary graphical user interface depicting identified email, selected text within an email and intent related data in accordance with an aspect of the present invention.

FIG. 11 illustrates an exemplary graphical user interface for selecting tasks to add to a task list in accordance with an aspect of the present invention.

DETAILED DESCRIPTION OF THE INVENTION

Figure 1:
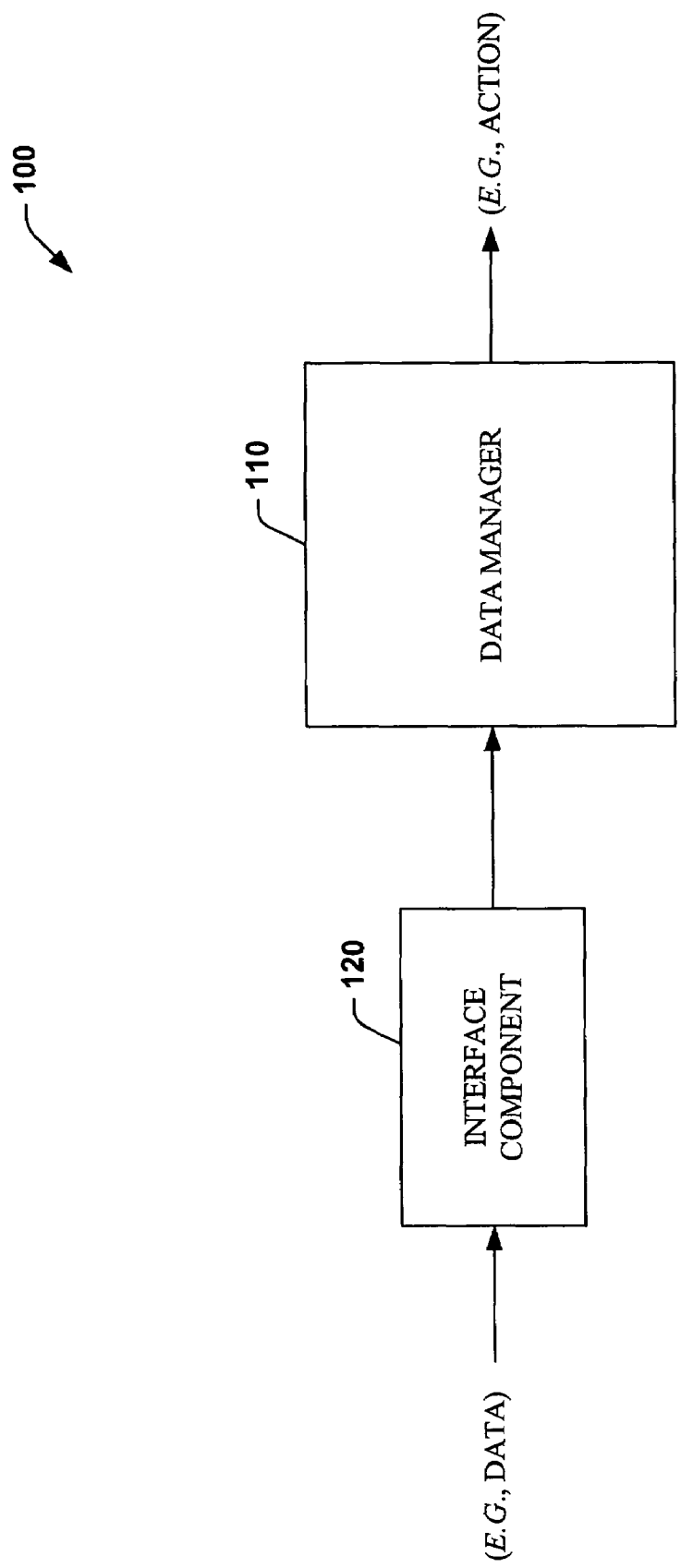
FIG. 1 illustrates an exemplary system that receives data, determines intent of the data, and generates corresponding actions and/or notifications.

The present invention relates to systems and methods for determining intent of data. Such intent can be determined via analyzing and categorizing the data, extracting features from the categorized data, and classifying the data based on the features to ascertain, infer and/or predict the intent. The data in which the intent was identified can then be transformed to a representation that can be provided to a user.

As used in this application, the terms "component," "system," "engine," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In addition, the term "inference" generally refers to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that determines intent and generates actions and/or notifications based thereon. The system 100 includes a data manager 110 and an interface component 120. The data manager 110, upon receiving data via the interface component 120, can employ various techniques to determine an associated intent of the data. In one instance, the data manager 110 utilizes information associated with the data such as metadata, properties, content, context, keywords, history, heuristics, inferences, rules, demarcations, etc. to group the data into one or more sets of data, wherein respective sets have similar characteristics. Such sets of data can be further processed to increase decision resolution or granularity. The data manager 110 can extract information from the resultant sets and utilize the extracted information to decipher intent.

The data manager 110 can analyze the intent to determine whether to respond to the data. When it is determined that a response should be provided, respective sets of data can be further refined and employed to generate a suitable response. Suitable responses include automatically performing an action and/or notifying a user, for example. Automatic responses can include answering questions, providing requested information, activating a device, scheduling a meeting, recasting a project, etc., and notifying the user can include inserting an item into the user's schedule, providing the user with a list of things to do, contacting the user (e.g., pager, cell phone, hand held . . . ), etc. In addition, user notifications can be conveyed to a messaging service and/or stored in memory for queuing and/or subsequent viewing by the user.

The interface component 120 can be utilized to couple the data manager 110 to essentially any entity that transmits data. For example, the interface component 120 can couple the data manager 110 to email systems, word processors, voice capture applications, telephones systems, video recorders/players, etc. Thus, the data can be in the form of email, a document, voice, and an image, for example, and variously formatted (e.g., structured and unstructured). In addition, the data can be transmitted to the interface component 120 and/or retrieved by the data manager 110 through the interface component 120. Such data can be conveyed directly to the interface component 120 and/or stored (e.g., locally or remotely) and subsequently provided to the interface component 120. In another instance, the interface component 120 can retrieve the data from a source and/or transmit a signal to the source to indicate that it is available to receive data. Moreover, such conveyances can be over a hardwired and/or wireless network and/or bus communication channel, for example.

Figure 2:
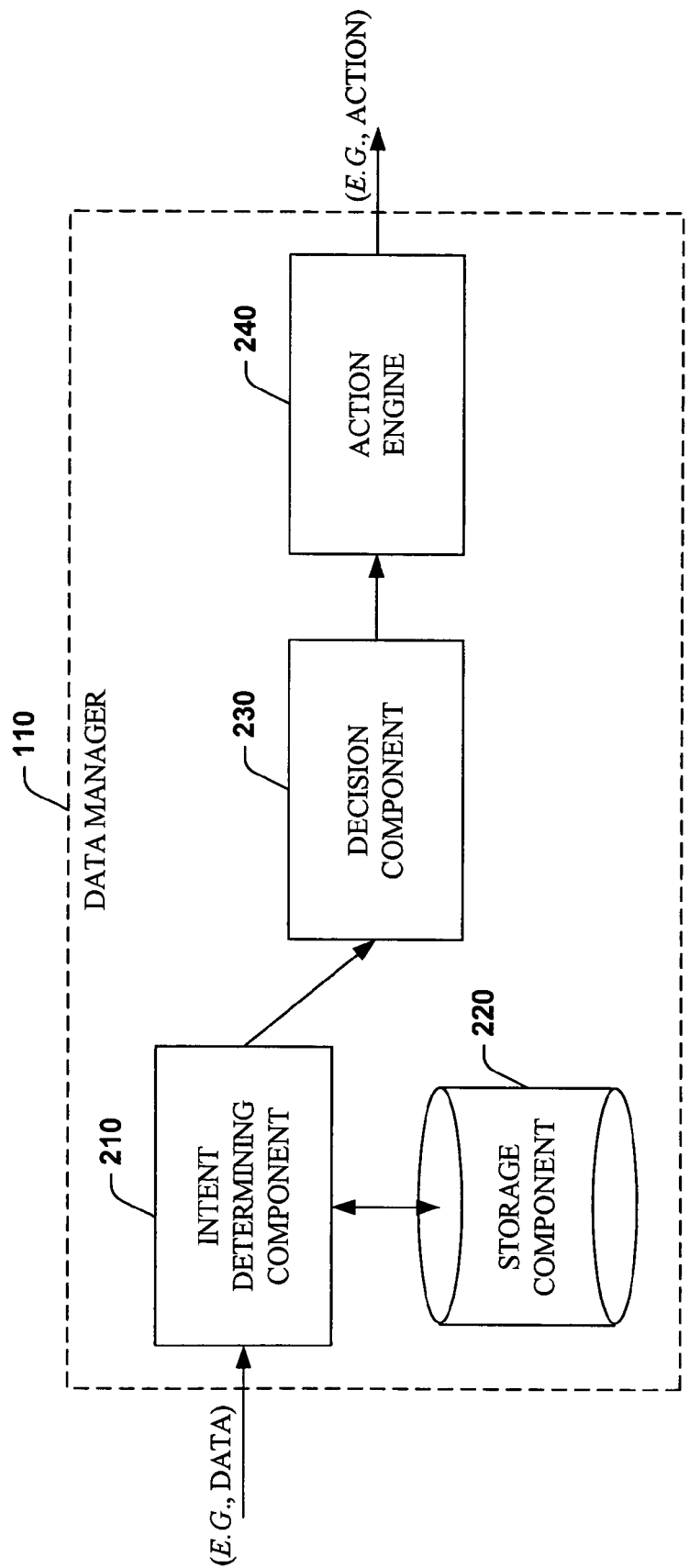
FIG. 2 illustrates an exemplary data manager that determines intent and generates corresponding actions and/or notifications.

FIG. 2 illustrates the data manager 110 in accordance with an aspect of the invention. As depicted, the data manager 110 can include an intent determining component 210, a storage component 220, a decision-making component 230 and an action engine 240. The intent determining component 210 can receive data such as email, messages, documents, audio, graphics, etc. Such data can be provided as one or more data bursts, a data stream, and a plurality of data packets, for example, and encrypted, encoded, compressed, and/or modulated within an envelope, for example. In addition, such data can be saved in the storage component 220. Saved data can be utilized to generate statistics and/or training sets, provide temporary storage, and/or maintain a copy to facilitate data error checking and error recovery.

The intent-determining component 210 can employ various techniques to determine an associated intent of the data. For example, the intent-determining component 210 can categorize the data based on metadata, location within the data, content, context, keywords, history, heuristics, inferences, rules, demarcations, etc. In addition, extrinsic information such the source of the data, the time of day and/or day of week the data was transmitted and/or received, cost/benefit of handling the data, etc. can be utilized to facilitate categorizing the data. The intent-determining component 210 can scrutinize the categorized data to determine the intent of the data. It is to be appreciated that such intent can be intent to do something (e.g., perform some action) or nothing (e.g., data associated with frivolous information).

Upon determining the intent, the data or subset thereof, the analysis and/or the intent can be saved to the storage component 220 and/or provided to the decision-making component 230. The intent can be represented in essentially any known format. For example, the intent can be provided as a binary indicator, a gray scale value, a percentage, confidence level, and/or a probability, for example. The decision-making component 230 can determine whether the intent warrants a response. For example, the decision-making component 230 can utilize a threshold to compare with the intent. The threshold can be user defined, default and/or automatically set based on past user responses. In addition, the threshold can be manually and/or automatically adjusted in real-time (dynamically) to adapt to various users and/or circumstances. Moreover, the threshold can be set based on inferences, predictions, probabilities, etc.

If after evaluating the intent it is determined that no further action is desired, the data can be discarded or forwarded to its destination. If it is determined that a response is desired, the data, the intent and/or any associated information can be conveyed to the action-engine 240. The conveyed information can be further analyzed and transformed into a linguistic representation, which can be utilized to generate a description. Such description can be utilized to automatically respond and/or notify a user via a visual and/or audible notification.

Figure 3:
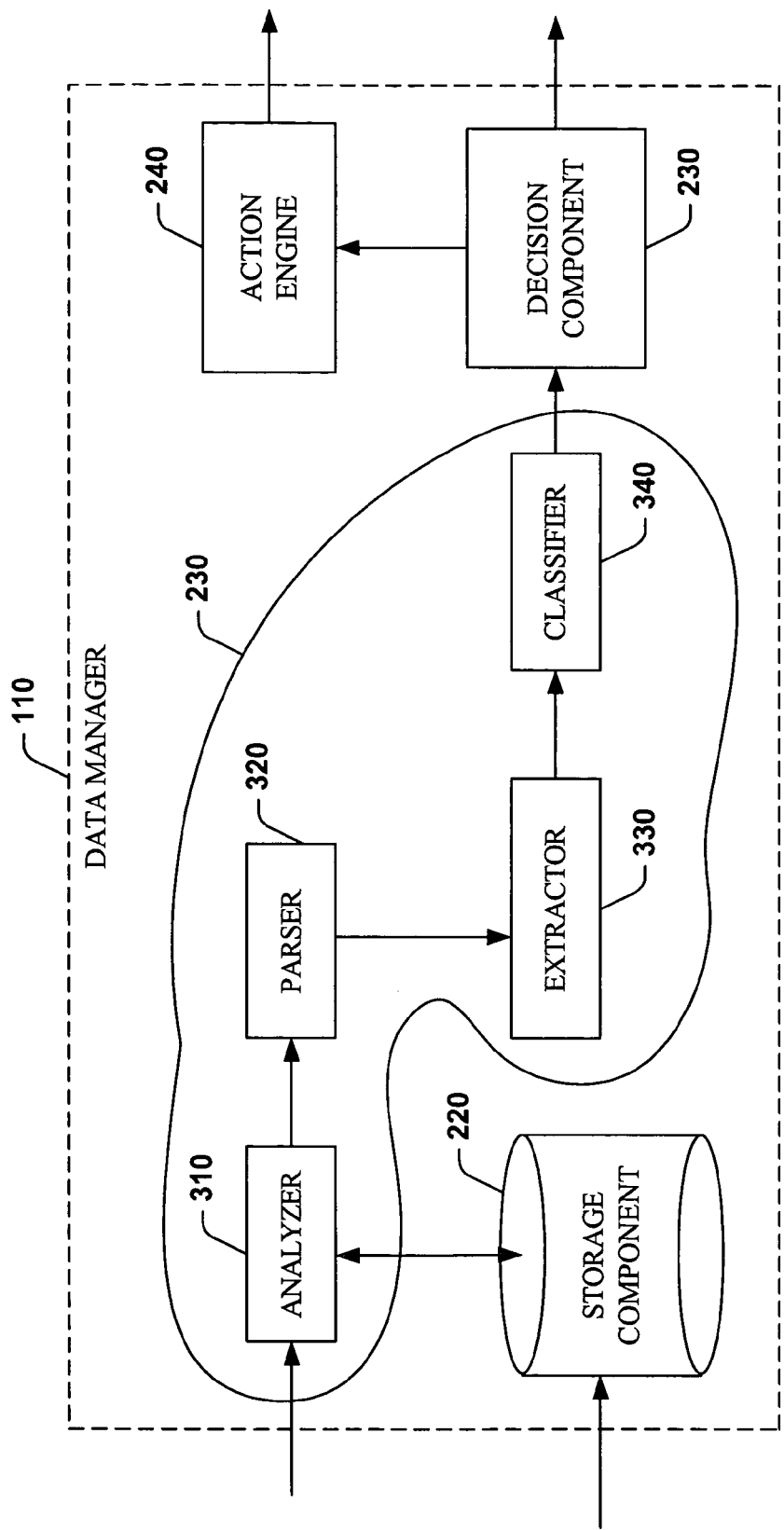
FIG. 3 illustrates a plurality of exemplary entities associated with a data manager that facilitates determining intent and generates corresponding actions and/or notifications.

FIG. 3 illustrates the data manager 110 in accordance with an aspect of the present invention. The data manager 110 comprises the intent determining component 210, the storage component 220, the decision-making component 230 and the action engine 240. In this example, the intent-determining component 210 includes the following components: an analyzer 310; a parser 320; an extractor 330; and a classifier 340. Data such as email, messages, documents, audio, graphics, etc. transmitted to the data manager 110 can be received by the analyzer 310 and/or the storage component 220. Such data can be provided via various techniques and formats, as described above. The analyzer 310 can scrutinize and categorize the data (e.g., parse into respective bins). Such categorization can include distinguishing between header, body, salutation, etc. The analyzer 310 can categorize the data based on metadata, location of a subset of data within the data, content, context, keywords, history, heuristics, inferences, rules, demarcations, extrinsic information such the source of the data, the time of day and/or day of week the data was transmitted and/or received, cost/benefit of handling the data, etc.

The parser 320 can scrutinize the categorized data and separate the data into logical structures such as strings, words, sentences, paragraphs . . . Similar to the analyzer 310, the parser 320 can utilize information such as metadata, location of the set of data within the data, content, context, keywords, history, heuristics, inferences, rules, demarcations, and/or other criteria to increase decision resolution or refine decision granularity. For respective structures, the extractor 330 can extract features.

The features can be conveyed to the classifier 340, which can determine intent. Such intent can be intent to do something (e.g., perform some action) or nothing (e.g., data associated with frivolous information) and can be provided as a binary indicator (e.g., "yes" or "no," "1" or "0," . . . ), a sliding scale, a percentage, confidence level, and/or a probability, for example. It is to be appreciated that the classifier can be any classifier such as a Support Vector Machine, Bayesian, knowledge-engineered classifier . . . Training sets can be manually and/or automatically generated and utilized during training-time to train the classifier. In addition, the classifier can be dynamically updated during run-time. In one aspect of the invention, the training sets at least include information related to data properties and linguistic structure.

As described above, the intent can be provided to the decision component 230, which can compare the intent with a threshold. For non-binary indicia, a threshold can be defined and utilized to render a decision such as respond or do not respond. For non-binary decisions, various circumstances can be considered to determine an appropriate cut-off point. For example, one user may decide it is better to err on the cautious side and have the system respond when there is a slightest chance that an action should be performed, whereas another user may decide that the cost of responding outweighs the cost of discarding data.

If after evaluating the intent it is determined that no further action is desired, the data can be discarded or forwarded to its destination. If it is determined that a response is desired, the data, the intent and/or any associated information can be conveyed to the action-engine 240, where it can be reformulated. For example, the data can be further analyzed, transformed into a logical representation, and utilized to generate a description. Such reformulated data can be in the form of words, phrases, fragments sentences, etc. and utilized to automatically respond and/or notify a user via a visual and/or audible notification.

Figure 4:
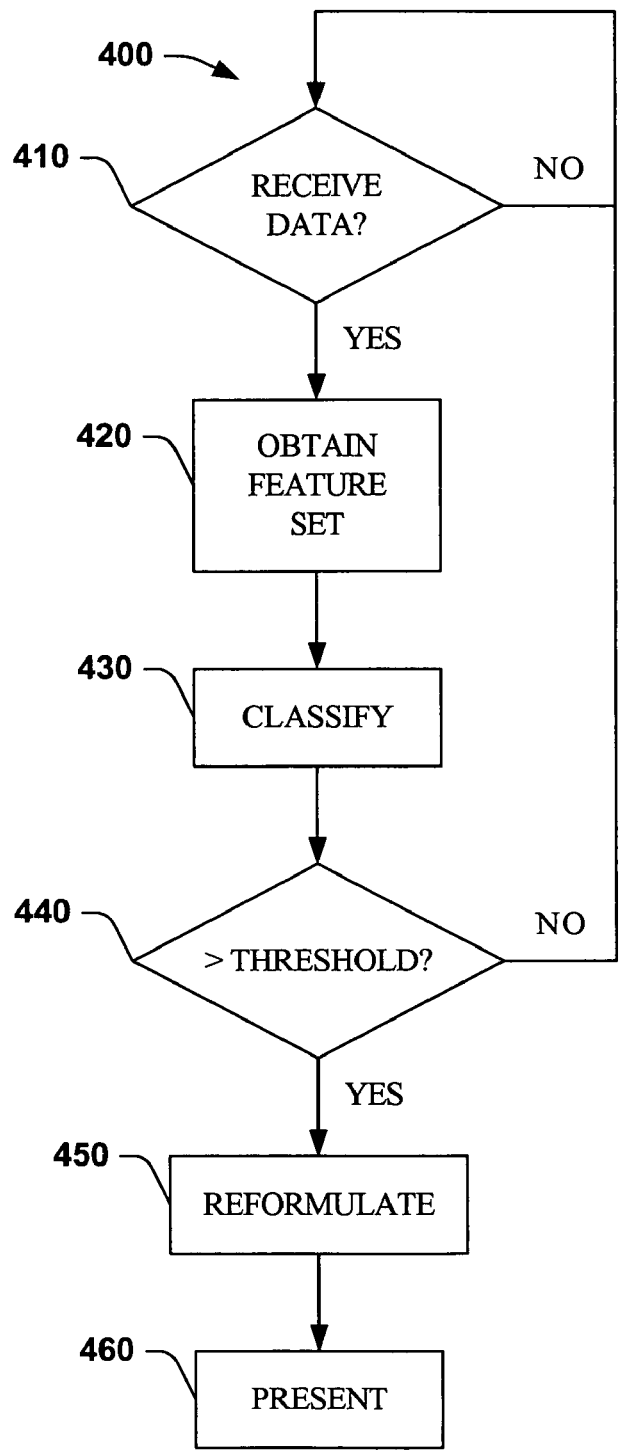
FIG. 4 illustrates an exemplary flow diagram for determining intent of data and automatically presenting a user with a description of the intent.
Figure 5:
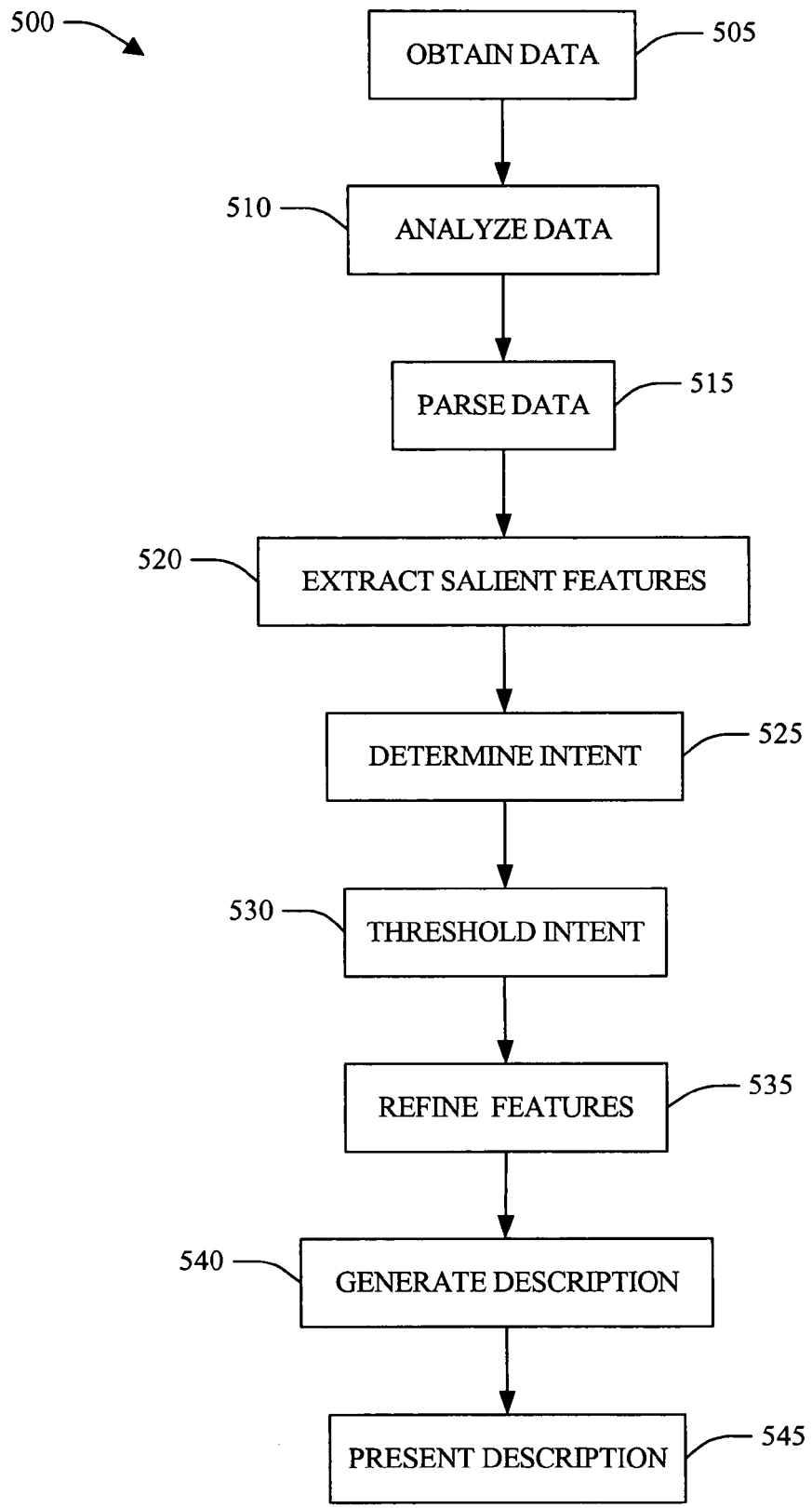
FIG. 5 illustrates an exemplary methodology for determining intent of data and automatically presenting a user with a description of the intent of the received data.

FIGS. 4-5 illustrate a flow diagram and methodology, respectively, in accordance with the present invention. While, for purposes of simplicity of explanation, the flow diagram and methodology are shown and described as a series of acts, it is to be understood and appreciated that the present invention is not limited by the order of the acts, as some acts can, in accordance with the present invention, occur in different orders and/or concurrently with other acts from that shown and described herein. Moreover, not all illustrated acts are required to implement the flow diagram and methodology in accordance with the present invention. The invention can be described in the general context of computer-executable instructions, such as program modules, executed by one or more components. Generally, program modules include routines, programs, objects, data structures, etc. that perform particular tasks or implement particular abstract data types. Typically the functionality of the program modules can be combined or distributed as desired in various embodiments.

FIG. 4 illustrates an exemplary flow diagram 400 in accordance with an aspect of the present invention. At reference numeral 410, it is determined whether data is present. If not, the system continues to wait. It is to be appreciated that the system can periodically poll for data and/or can be notified when data is ready to be conveyed. If it is determined data is available, at 420 one or more feature sets are obtained from the data. In addition, features can be extracted based on metadata, content, context, keywords, history, heuristics, inferences, rules, demarcations, extrinsic information such the source of the data, the time of day and/or day of week the data was transmitted and/or received, cost/benefit of handling the data, etc.

At reference numeral 430, the features can be conveyed to a machine-learned classifier to determine intent. Such intent can be intent to do something (e.g., perform some action) or nothing (e.g., data associated with frivolous information). At 440, if it is determined that the intent does not require any further action, the system transitions back to an idle or wait state at 410. However, if at 440 it is determined that further action is required, then at 450 the data is reformulated. Such reformulation can include further refining of the data and generation of data useful to apprising a user. At reference numeral 460, such data can be presented to the user, for example, within a graphical user interface and/or audio information.

FIG. 5 illustrates an exemplary methodology 500 in accordance with an aspect of the present invention. At reference numeral 505, data such as email, messages, documents, audio, graphics, etc. is obtained. At 510, the data is scrutinized and categorized. Such categorization can include distinguishing between header, body, salutation, etc., based on metadata, location of a subset of data within the data, content, context, keywords, history, heuristics, inferences, rules, demarcations, extrinsic information such the source of the data, the time of day and/or day of week the data was transmitted and/or received, cost/benefit of handling the data, etc. At 515, the categorized data can be parsed into linguistic structures (e.g., strings, words, sentences, paragraphs . . . ) and further delineated to achieve greater resolution. Such refinement can be facilitated by metadata, location of the set of data within the data, content, context, keywords, history, heuristics, inferences, rules, demarcations, and/or other criteria to increase decision resolution or refine decision granularity.

At 520, features can be extracted from respective structures. The features can be utilized to train classifiers that determine intent. Suitable classifiers include support vector machines, Bayesian classifiers, knowledge-engineered classifiers, for example. At reference numeral 525, the classifier determines the intent. At 530, it can be determined whether there is the intent to do something or merely an idle intent. Such determination can be based on a comparison with pre-defined threshold. If at 530 it is determined that no further action is desired, the data can be discarded or forwarded to its destination. If at 530 it is determined that a response is desired, the data, the intent and/or any associated information can be utilized to generate a logical form at 535. At 540, a description can be generated based on the logical form. At 545, description can be presented to user via a user interface.

Figure 6:
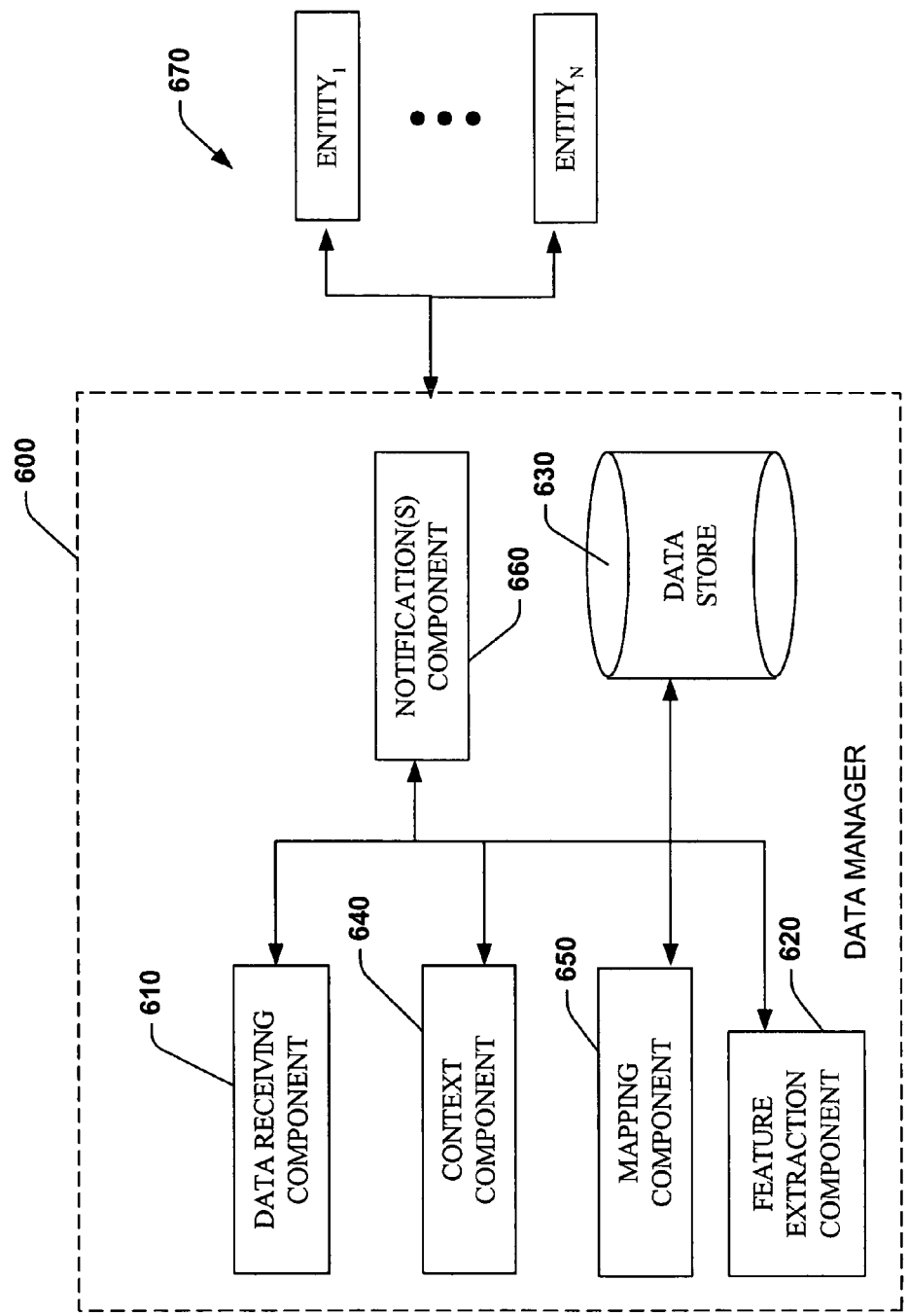
FIG. 6 illustrates an exemplary data manager that communicates with a plurality of entities to facilitate proactive measures to mitigate negative consequences associated with inaction in connection with data.

FIG. 6 illustrates, a data manager 600 in accordance with an aspect of the present invention. The data manager 600 includes a data-receiving component 610 that receives an item (e.g., data) including content as well as extrinsic data/evidence. An extraction component 620 parses the received item, for example based in part on the extrinsic data/evidence. The extraction component 620 removes extraneous features associated with the item in connection with facilitating the data manager 600 to reformulate the item as part of converging on intent of the item. A data store 630 can store information from the receiving component 610 and/or the extraction component 620, as well as rules, tables, indices, algorithms, historical data, schemas, etc., to facilitate determining, inferring and/or predicting intent in accordance with the invention as well as taking action, scheduling action, not taking action, etc. The data manager 600, for example, can facilitate taking proactive measures to mitigate negative consequences associated with inaction in connection with an item.

More particularly, the data manager 600 can parse content associated with an item—the content can be text, audio, graphical, etc. and using various techniques (language processor, image recognition, voice recognition . . . ) identify extraneous features of the content and remove them and/or discount them as part of a reformulation process to converge on intent of the item. For example, the data manager 600 can identify or infer parts of an item that corresponds to task(s) and trim away extraneous features. As part of the reformulation process, for example, pronouns can be recast as names or other explicit references and implicit dates ("tomorrow", "next week") can be recast as explicit dates ("Feb. 20, 2005"). The data manager 600 understands linguistics and/or semantics of a language as part of performing logical reconstruction. The data manager 600 can include a classifier or other machine learning system in connection with understanding linguistics and/or semantics of content.

Thus, the data manager 600 provides for a rich analysis system that couples feature extraction with linguistic understanding of content to determine, infer and/or predict intent of an item. In accordance with one specific exemplary implementation of the data manager 600, a real natural language processor can be employed that parses the item in connection with reformulation to converge on intent—logical construction. The reformulation can also be used to retranslate intent into another language as well as different format for conveying intent (e.g., via graphical-based message). Moreover, the data manager 600 can take action based on the determined intent (e.g., prioritizing, calendaring, automated action . . . ).

The data manager 600 can use extrinsic evidence (e.g., sender, time of day, attachments, co-recipients, urgency . . . ) in connection with reformulation. Moreover, the data manager 600 can employ n-gram-based type of analysis as well as employ relation of related feature type of analysis and distill content of item down to a single sentence for example and convey such intent via the single sentence (e.g., pop-up bubble). More particularly, once intent is determined, the intent can be conveyed in a very streamlined manner (e.g., synopsis, headline, icon, graphical-based intent conveyance—picture(s), colors . . . ).

The data manager 600 further includes a context component 640 that provides for selectively determining context of data regarding an item in connection with the subject invention. A mapping component 650 facilitates mapping intent to tasks or actions for example. The mapping component 650 can also facilitate classification in accordance with the invention by serving as a pre-filter of data. A notification component 660 can provide notification(s) to individuals, computers or systems regarding intent analyses and recommendations in accordance therewith by the data manager 600. It is to be appreciated that the data manager 600 can communicate with a plurality of entities 670 (e.g., individuals, groups, devices, computers, systems . . . ) in connection with intent analyses, wherein data can be received from as well as transmitted to the entities.

Figure 7:
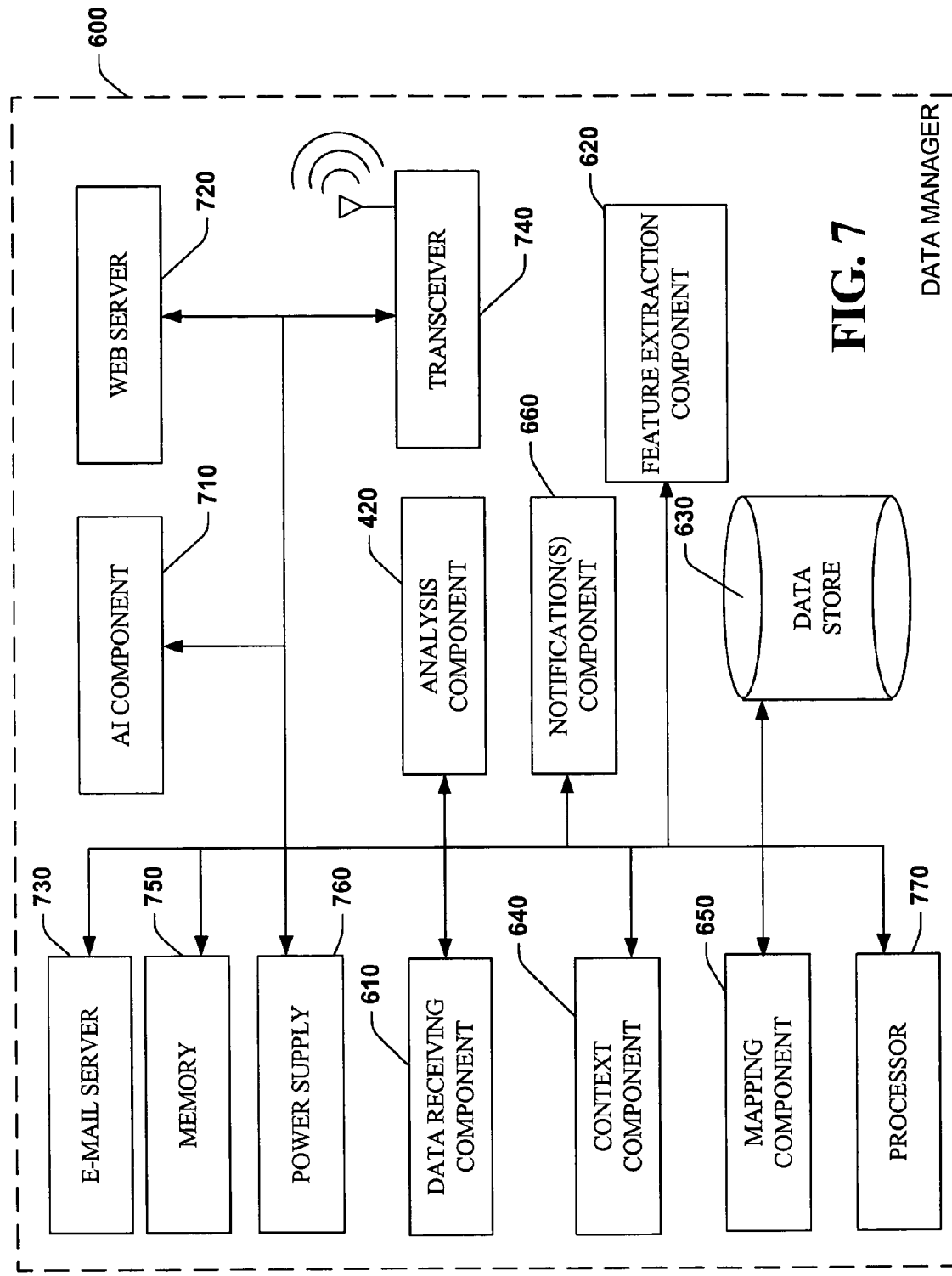
FIG. 7 illustrates an exemplary data manager that employs intelligence to facilitate determining intent.

FIG. 7 illustrates the data manager 600 with components that affect various functionalities in accordance with the invention. An artificial intelligence (AI) component 710 provides for effecting various automated functionality in accordance with the invention. The AI component 710 can employ classifiers in connection with determination, inference, diagnostics, prognostics, and prediction. It is to be appreciated that classification in accordance with various aspects of the present invention can employ a probabilistic and/or statistical-based analysis (e.g., factoring into the analysis utilities and costs) to prognose or infer an action that a user desires to be automatically performed. A classifier can be a function that maps an input attribute vector, $x=(x_1, x_2, x_3, \ldots, x_n)$, to a confidence that the input belongs to a class-that is, $f(x)=\text{confidence(class)}$. For example, a support vector machine (SVM) classifier can be employed—an SVM generally operates by finding a hyper plane that separates positive examples from negative examples in a multi-dimensional feature space. Other directed and undirected models classification approaches including, e.g., naïve Bayes, Bayesian networks, decision trees, and probabilistic classification models providing different patterns of independence can be employed. Classification as used herein also is inclusive of statistical regression that is utilized to develop models of priority. The data manager 600 also includes a web server 720, an e-mail server 730, and a wireless transceiver 740 in connection with various communicative aspects of the invention and a memory 750, a power supply 760 and processor 770.

Figure 8:
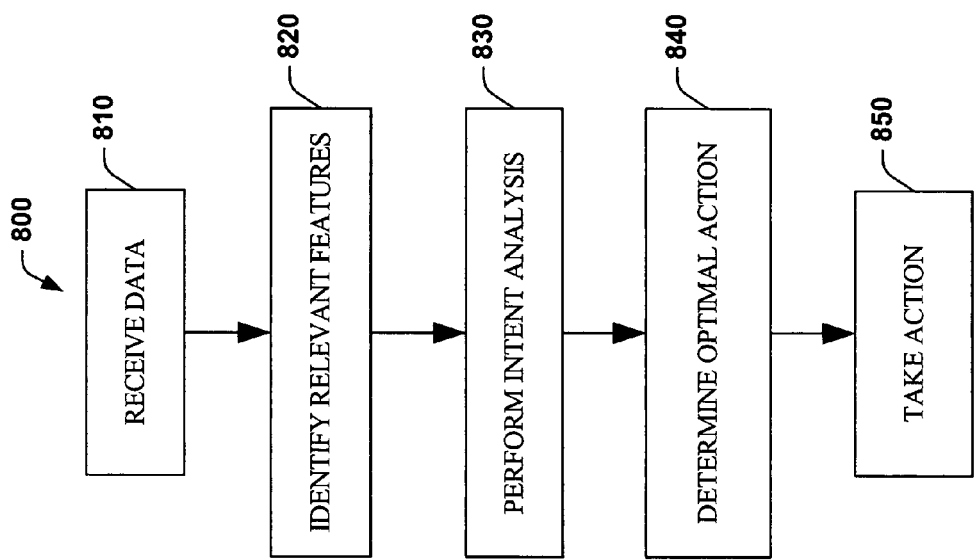
FIG. 8 illustrates an exemplary methodology for automatically responding to data based on intent of the data.

FIG. 8 illustrates a methodology 800 in accordance with the present invention. While, for purposes of simplicity of explanation, the methodologies are shown and described as a series of acts, it is to be understood and appreciated that the present invention is not limited by the order of the acts, as some acts can, in accordance with the present invention, occur in different orders and/or concurrently with other acts from that shown and described herein. Moreover, not all illustrated acts can be required to implement the methodology in accordance with the present invention. The invention can be described in the general context of computer-executable instructions, such as program modules, executed by one or more components. Generally, program modules include routines, programs, objects, data structures, etc. that perform particular tasks or implement particular abstract data types. Typically the functionality of the program modules can be combined or distributed as desired in various embodiments.

Proceeding to FIG. 8, at 810 data is received. At 820, relevant features of the data are identified and parsed. At reference numeral 830, the parsed content is analyzed and a reformulation of the content is performed to converge on intent. Such reformulation can include a linguistic analysis as well as feature analysis, for example. At 840, a determination is made as to optimal action to be taken based on the reformulation. For example, data can be moved to a specific folder, or if the item corresponds to a task, further reformulation can be performed to determine, infer and/or predict the task to be performed as well as the necessary action to be taken (e.g., calendar a meeting, send an e-mail, notify someone, send a document, cancel a meeting . . . ). At reference numeral 850, a suitable action is performed.

Figure 9:
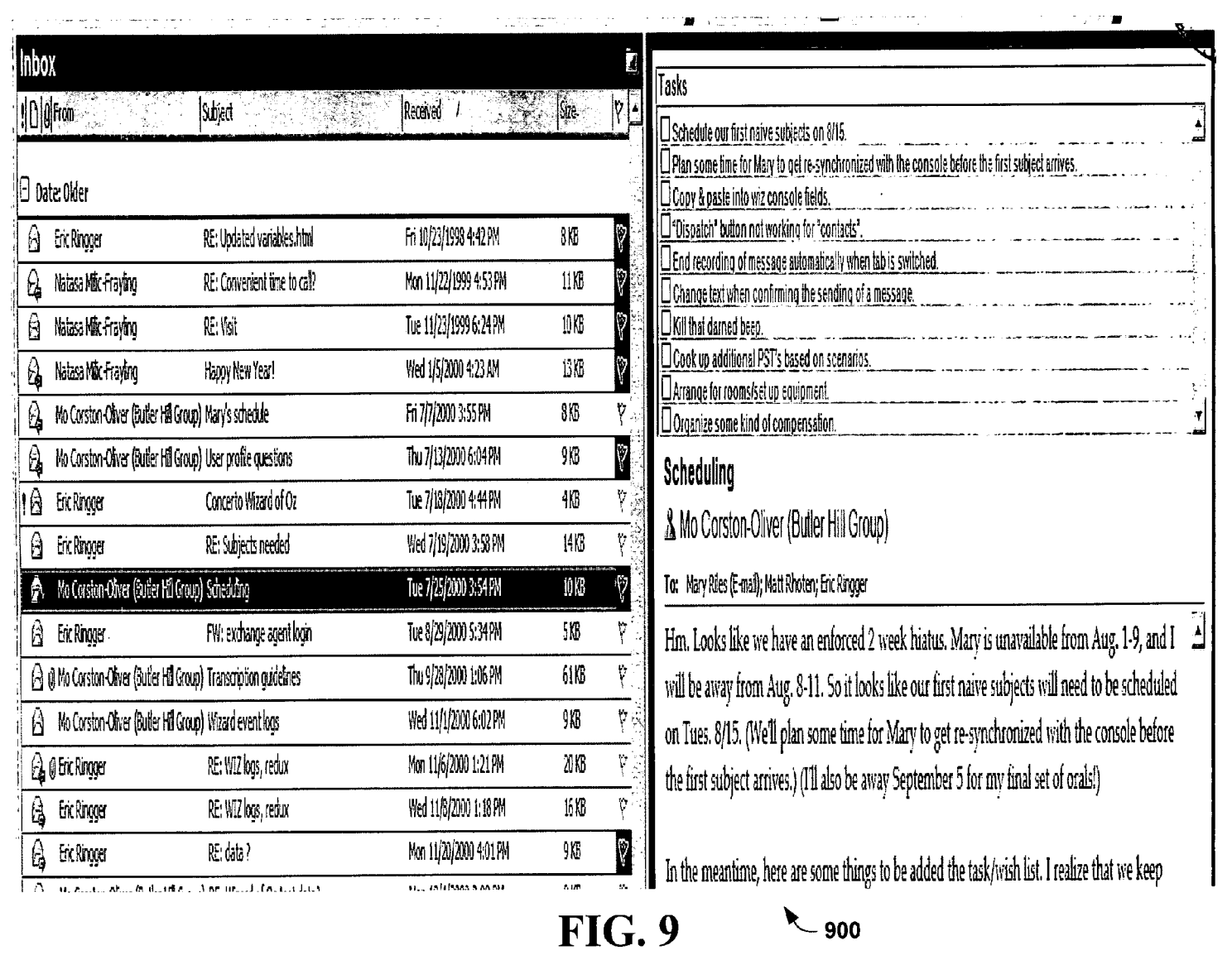
Figure 10:
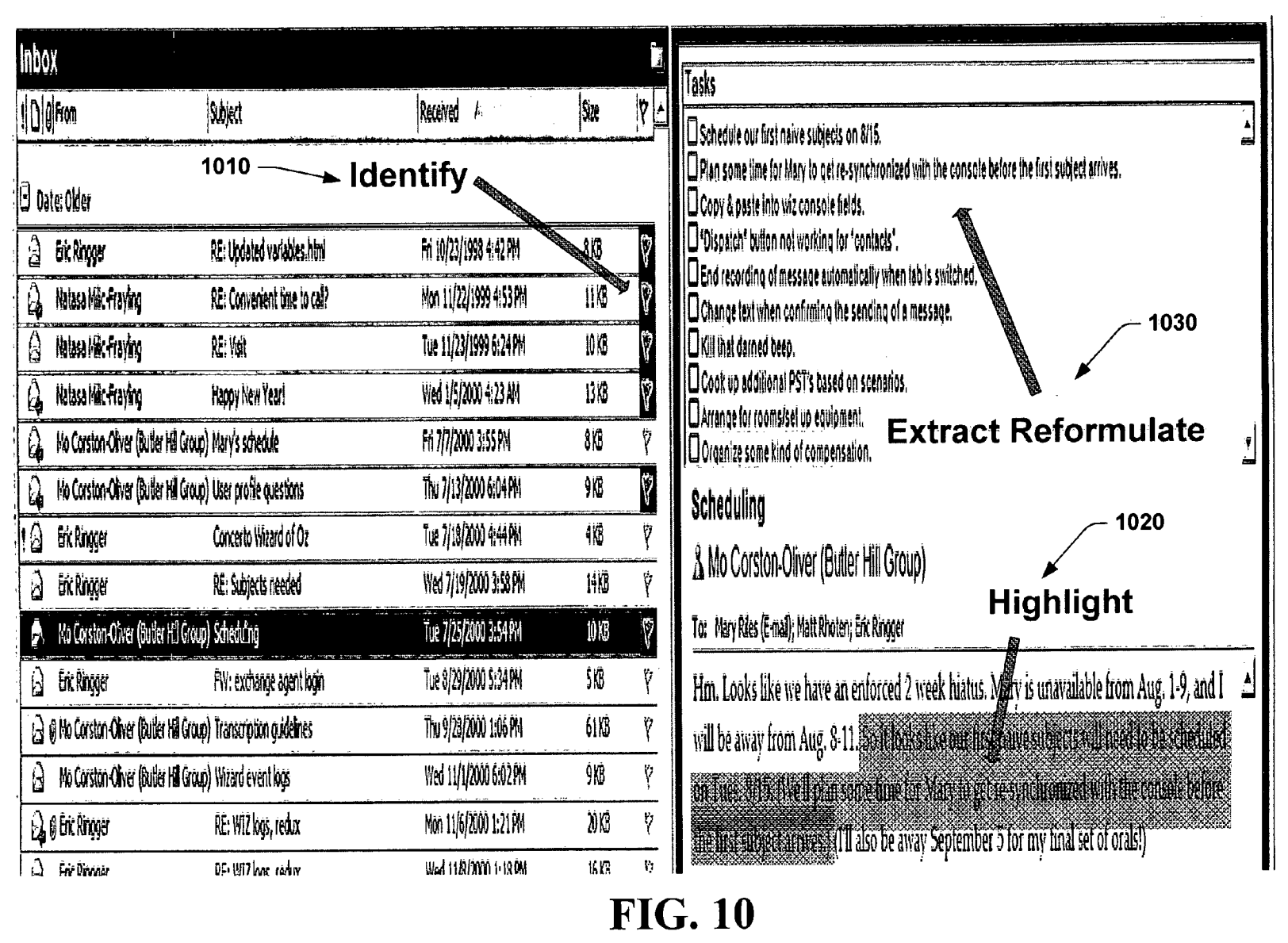

FIGS. 9-11 illustrate exemplary user interfaces that facilitate the invention described herein. As discussed in detail above, upon receiving data, intent can be determined and a corresponding action can be performed. By way of example, after receiving an email message, a superficial analysis of the email can be performed to distinguish sections within the email. For example, the email can be delineated via the following: a header, a message body, and forwarded sections. The identified message body can be separated by sentences. For respective sentence, features can be extracted and processed by a machine-learned classifier in order to obtain an estimate of a probability that a sentence is a "Task." If the sentence is a "Task," the sentence can be analyzed to produce a logical form. The logical form can be transformed and utilized to generate a "Task" description, which can be presented to a user via a user interface. Such presentation can occur by automatically adding it to the user's task list. FIG. 9 depicts an exemplary user interface 900 for such an email system. FIG. 10 shows various emails that have been identified (as described herein) at 1010. In addition, FIG. 10 shows highlighted data within an email at 1020 and extracted and reformulated data (e.g., strings) at 1030. FIG. 11 illustrates a task list being populated via reformulated data selected by the user and/or automatically.

Figure 12:
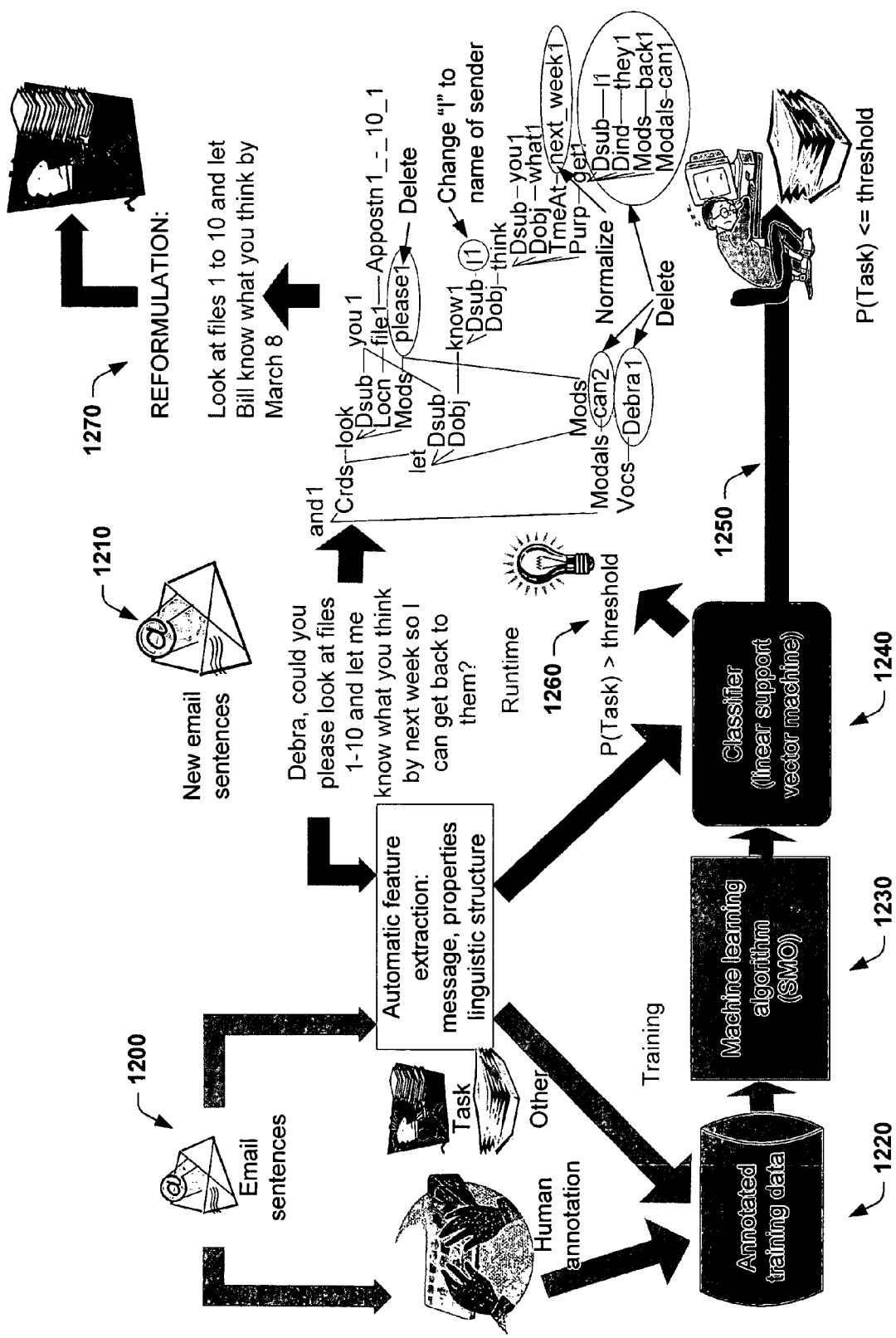
FIG. 12 illustrates an exemplary intent analysis system.

FIG. 12 provides an example illustrating various training and run-time aspects of the subject invention. At 1200 and 1210, email sentences and new email sentences, respectively, are received. At 1220, an annotated data set is generated from the received email via a manual and/or automatic technique. At 1230, the training sets are fed into a machine-learning algorithm, which is utilized to construct a machine-learned classifier. At 1240, the machine-learned classifier employs the algorithm to render a probability that received data includes a task (e.g., P(Task)). If at 1240, the probability exceeds a predefined threshold, then at 1270, the email is reformulated and automatically added to the user's task list.

The following paragraphs illustrate exemplary training and run time techniques in accordance with aspects of the present invention.

Exemplary Feature Extraction

At both training time and run-time, email messages can be similarly processed. For example, the systems described herein can identify a header, forwarded sections, and a message body of the email. In one instance, the header can be identified by searching for keywords such as "To," "CC," "From," and "Subject," for example. The forwarded sections can be identified by searching for expressions such as the presence of line-initial ">" symbols or identifying material that typically follows text such as "Original Message." The message body can be identified by searching for new content of the message, for example, defined as anything that is not the header or a forwarded section.

Upon identifying such information, salient features can be obtained. For example, information such as the number of addressees; the total size of the message; the message priority; and whether the message had an attachment can be obtained. In addition, the message body can be broken into sentences using any known sentence separator. For respective sentences in the body, a feature vector can be built, wherein the feature vector can include the message-level features extracted and the identified salient features of the sentence. Such information can be indicative of whether the sentence appears to be the sender's name or an abbreviation of the sender's name and linguistic features, such as words that occur in the sentence; word bigrams that occur in the sentence; word trigrams from the sentence; features that result from a linguistic analysis, including syntactic structure and properties and logical form structure and properties. It is to be appreciated that the set of features to employ can be an open research question as described in detail below. It is further to be appreciated that any suitable machine-learned classifier can be used, such as, for example, a Support Vector Machine (SVM) and a knowledge engineered component (e.g., hand-written code that considered the features extracted and that then predicted Task vs. Non-task.).

Exemplary Training Data and Model Training

In order to create training data for a machine-learned classifier, a human annotator can review respective sentences in the message body of respective messages in a training set. For such sentences, the annotator can decide whether the sentence should be classified as a task or not. The annotator's judgment can be referred to as the target value or target class. Features can be automatically extracted for respective sentences and paired with the target value. A machine-learned classifier can be trained to distinguish tasks from non-tasks with respect to the automatically extracted features.

Exemplary Run-Time Application

At run-time, the systems described herein can process a given email message in the manner described herein. For respective sentences in the message body, the associate feature vector can be presented to the machine-learned classifier, which produces an estimate of a probability that a sentence is a task (e.g., P(Task)). If a sentence is deemed a task (e.g., the P(Task) exceeds a threshold), the sentence can be analyzed to produce a logical form. The logical form can be reformulated and utilized to generate a task description from the logical form. The generated task description can be provided to the user, for example, by automatically adding it to a user's task list of a user interface.

Exemplary Reformulation of a Task

The systems described herein can perform a rule-based post-processing of extracted task sentences in order to reformulate them as task-like imperatives. For example, the sentence "Oh, by the way, could you just send me a few sentences by EOD Friday?" can be reformulated to "Just send Rich a few sentences by EOD Feb. 20." Such reformulation can involve various acts. For example, one act can include producing a logical form for an extracted sentence. Another act can include identifying the part of the sentence that includes the task. Yet another act can include (in essentially any order) focusing on the identified part and removing from the logical form extraneous material, normalizing certain elements of the sentence whose reference varies with the speaker or time, and, where appropriate, labeling the fragment as an imperative sentence. Still another act can include passing the resulting structure to a sentence-realization component, which can generate a sentence from the structure. The following sections discuss the foregoing acts in more detail.

As briefly noted above, one act can include producing a logical form for an extracted sentence. This can comprise producing a representation that shows the semantic and deep syntactic relations among the various parts of the sentence. This representation can be a graph, whose nodes represent the parts of the sentence being analyzed, and whose edges represent the relations among those parts. Additionally, the nodes themselves can be annotated with additional information having to do with its interpretation, such as whether it is a question or command, for example.

A sentence containing a task can have non-task content. As such, heuristics can be utilized when identifying the part of the logical form that corresponds to the task. This can include the whole sentence or any sub-part of the sentence. The heuristics utilized can facilitate locating features relevant to tasks, such as whether the sentence is imperative, whether the subject of a sentence is "you", whether modality words such as "please" or a modal verb is used, etc. Further processing can be performed on the identified logical form, wherein remaining portions can be ignored.

Words, phrases and/or clauses deemed unnecessary to task formulation can be removed from the logical form. Such information can include modal words such as "please" and/or various auxiliary verbs such as "must," "could," etc., as well as certain subordinate clauses and adverbial modifiers. For example, in the sentence "Oh, by the way, could you just send me a few sentences by EOD Friday?," the phrase "oh, by the way" and the auxiliary verb "could" can be removed from the logical form. In addition, certain deictic elements (i.e., words or phrases whose reference changes depending on who is speaking or being spoken to, or when or where a sentence is uttered or written) can be normalized. For example, they can be replaced by non-deictic elements with constant reference. For example, a first person pronoun, which refers differently for different speakers, can be replaced by the name of the sender of the email or by a third person pronoun that unambiguously refers to the sender. Similarly, a deictic time expression such as "Friday," which may refer to a different date depending on the week that it is spoken, can be replaced by a specific date (e.g., "Feb. 20"). Moreover, if the logical form has certain features that indicate it could be formulated as an imperative (e.g., a command) sentence, it can be annotated as an imperative.

A sentence can be regenerated by passing the resulting logical form, or structure to a sentence-realization component. Such component can utilize known technology that underlies the suggestion of rewrites in grammar checkers.

Exemplary Customization

A user can be provided an ability to define (e.g., by adjusting a slider) the trade-off between precision and recall of tasks, for example, in order to specify whether they would rather see all predicted tasks, no matter how minor, or only the tasks predicted with the highest confidence. Other customization can include configuring the system to automatically add tasks to the user's task list; visually indicate (e.g. by displaying a special icon or by coloring a message) that an email message contains one or more tasks, which can be filtered to only see messages that contain tasks; display, in the preview of a message, tasks present in the message rather than displaying the first n bytes; highlight sections of a message that correspond to tasks; and, when a user opens a message, display a list of tasks extracted from the message, which allows the user to check messages to add them to their task list or to move them to a shared set of tasks (e.g., on a SharePoint team site or to assign the task to someone else).

Figure 13:
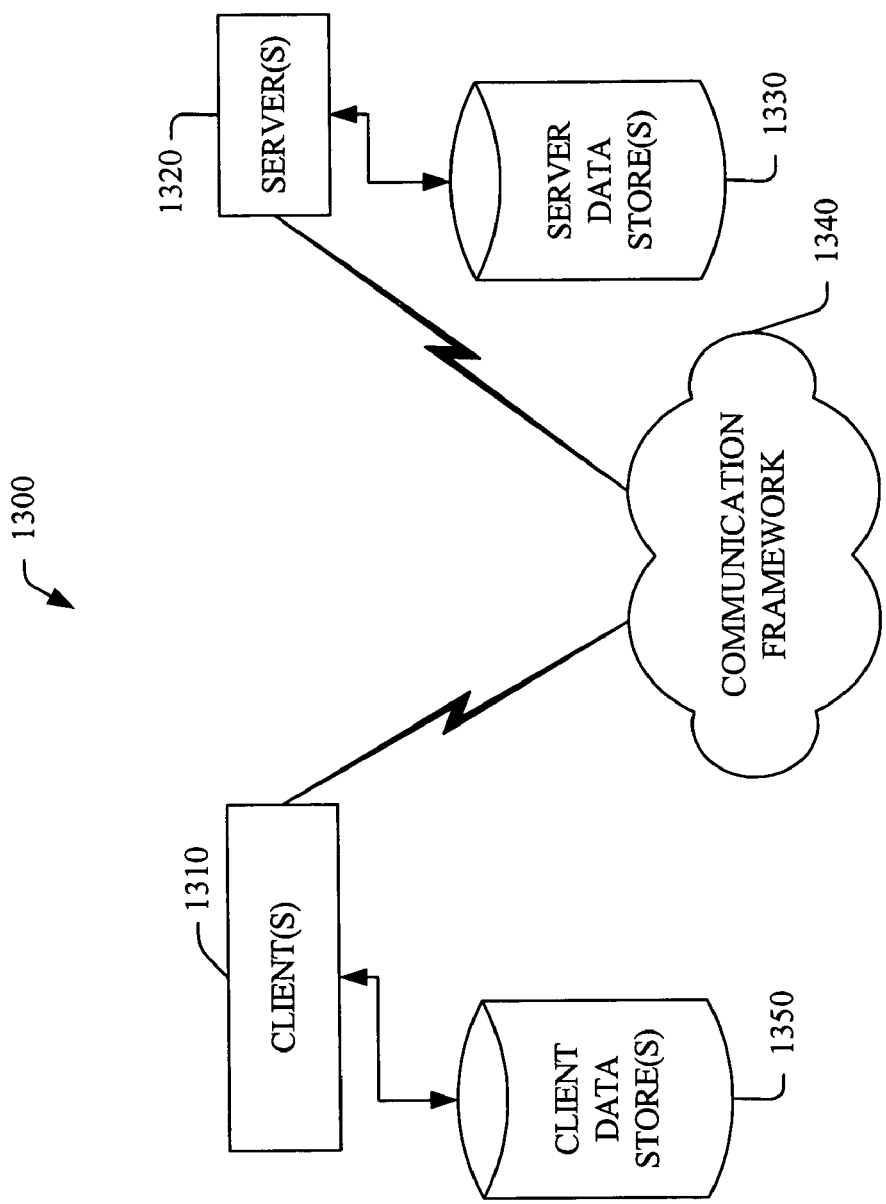
FIG. 13 illustrates an exemplary networking environment, wherein the novel aspects of the present invention can be employed.
Figure 14:
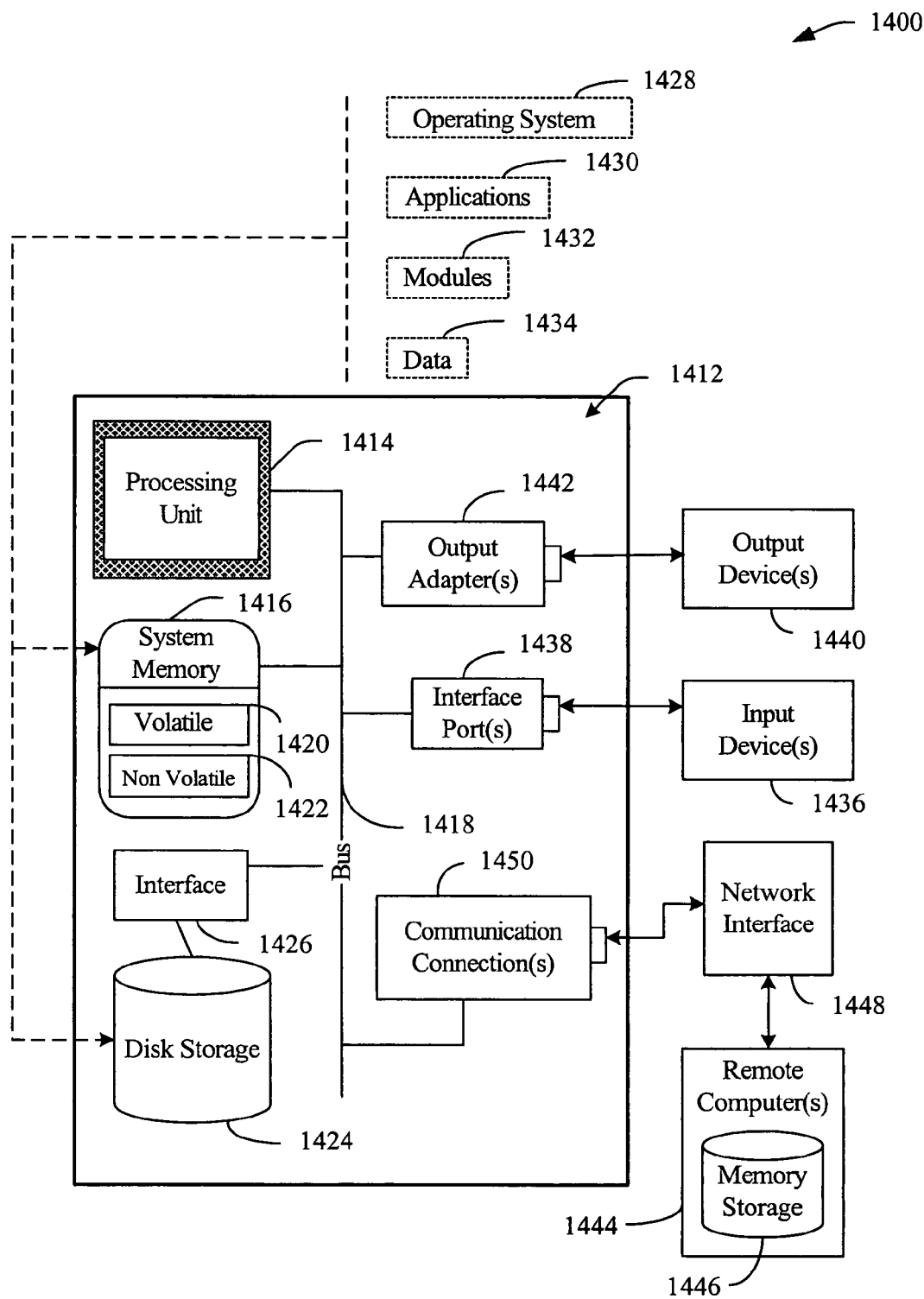
FIG. 14 illustrates an exemplary operating environment, wherein the novel aspects of the present invention can be employed.

In order to provide additional context for implementing various aspects of the present invention, FIGS. 13-14 and the following discussion is intended to provide a brief, general description of a suitable computing environment in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1320. The server(s) 1320 can also be hardware and/or software (e.g., threads, processes, computing devices). The servers 1320 can house threads to perform transformations by employing the present invention, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1320.

With reference to FIG. 14, an exemplary environment 1400 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates data handling, comprising:
   a component that receives data, wherein the data is a message sent to a user from another user; and
   a data manager that determines an intent of the data, wherein the data manager determines a probability of the determined intent, the data manager reformulates at least a subset of the data based on the intent, and automatically presents the reformulated data to the user, the data manager upon determination that the intent is a task that the user is to perform and that the determined probability of the intent being a task exceeds a user defined threshold, automatically reformulates the subset of data into a specific task assignment and adds the task assignment to the user's task list.

2. The system of claim 1, the data manager further analyzes the data, groups the data into one or more sets with related characteristics, and extracts features from at least one of the sets of data to form the subset of data.

3. The system of claim 2, the data manager utilizes at least one of metadata, properties, content, context, a keyword, history, heuristics, an inference, a rule, a demarcation, a time of day, a day of week, an associated handling cost, an associated handling benefit, or a source of the data to facilitate analyzing the data.

4. The system of claim 2, the features are extracted based at least in part on one of a syntactic structure, a syntactic property, a linguistic structure, or a linguistic property.

5. The system of claim 4, the linguistic features includes one or more of a word that occurs in a sentence, a word bigram that occurs in the sentence, or a word trigram that occurs in the sentence.

6. The system of claim 1, further comprising a classifier that determines the intent of the data from one or more features extracted from the data.

7. The system of claim 6, the classifier is a machine-learned classifier that is trained via at least one of manually or automatically generated data sets.

8. The system of claim 6, the classifier is one of a support vector machine or a knowledge-engineered component.

9. The system of claim 1, the reformulation of the data includes producing a logical form of the data and generating an action description from the logical form based on the intent.

10. The system of claim 9, logical form comprises at least one non-deictic element that replaced a deictic element in the data.

11. The system of claim 1, further comprising performing an action based on the intent, the action comprising at least one of automatically responding to a question; returning requested information; activating a device; scheduling a meeting; recasting a project; audibly notifying a user; visually notifying the user; inserting an item into the user's schedule; contacting the user; or adding the item to the user's to do list.

12. The system of claim 9, wherein a deictic time expression is replaced with a specific time expression.

13. The system of claim 1, the data is an email a document, an audio file, or an image.

14. The system of claim 1, the intent is represented as one of a probability, a confidence level, a percentage, or a binary value.

15. The system of claim 1, further comprising a threshold component that determines whether to reformulate and present the reformulation to the user based on a comparison of the intent with one of a default, user defined or intelligence generated threshold.

16. A system that automatically responds to messages, comprising:
   an analyzer that scrutinizes a received message to distinguish one or more disparate parts of the message, wherein the message is sent to a user from another user;
   a parser that separates the parts into respective bins;
   an extractor that retrieves sentences from at least one of the bins;
   a classifier that determines an intent of the message from the sentences, wherein the intent includes an indication value to the user of the cost of responding to the message versus the cost of discarding the message;
   a reformulator that transforms the sentences into a single sentence indicative of the intent; and
   a decision component that presents the single sentence to the user upon the indication value exceeding a threshold value, wherein the threshold value is automatically determined based at least upon an inferred current state of the user based upon observation of the user.

17. The system of claim 16, the message is an email, a document, audio, and an image 18. The system of claim 16, the bin utilized to obtain the features includes a message body of the received message.

19. The system of claim 16, the classifier generates a probability that the message includes a task assignment from the another user to the user.

20. The system of claim 16, the reformulator produces a logical representation of the retrieved sentences.

21. The system of claim 20, the logical representation is utilized to generate a task description.

22. The system of claim 21, the task description is automatically added to a user's task list.

23. The system of claim 16, the single sentence is transformed into graphical representation of the intent.

24. The system of claim 16, the set of data indicative of the intent includes semantic and syntactic relations between features.

25. The system of claim 16, the classifier is trained with an annotated set of data.

26. The system of claim 16, the reformulator replaces deictic elements with non-deictic elements.

27. A computer-implemented method that facilitates data handling, comprising:
    accepting data, wherein the data is a message sent to a user from another user;
    analyzing the data to determine an associated intent, wherein the intent includes a confidence value of the accuracy of the determined intent;
    reformulating at least part of the data to produce a description of the intent; and
    selectively presenting the description to the user based upon the confidence value associated with the intent exceeding a dynamically generated threshold, the value indicating whether to respond to the data, the threshold is dynamically generated based upon at least an inferred current state of the user based upon observation of the user.

28. The method of claim 27, further comprising providing the analysis to a machine-learned classifier to generate a probability indicating whether to respond to the data.

29. The method of claim 28, the classifier is trained via at least one of manually and automatically generated data sets.

30. The method of claim 28, the classifier is one of a support vector machine and an instruction set that considers extracted features.

31. The method of claim 27, the reformulation comprises producing a logical form of the data, which is transformed to produce the description.

32. The method of claim 27, further comprising extracting features from the data based at least in part on one of a syntactic structure, a syntactic property, a linguistic structure, and a linguistic property.

33. A computer-implemented method that facilitates message handling, comprising:
    separating a message into groups of similarly related parts, wherein the message is received by a user from another user;
    extracting salient features from at least one of the groups;
    computing an intent from the extracted features, wherein the intent includes a confidence value of the accuracy of the determined intent;
    producing a logic representation of the features based on the intent;
    transforming the representation to generate a description of an action related to responding to the data to provide to the user, the description of the action is a specific task assignment for the user; and
    automatically adding the task assignment to a task list of the user upon the confidence value exceeding a user specified threshold.

34. The method of claim 33, further comprising categorizing the groups as associated with a header, a message body and a salutation of the message.

35. The method of claim 33, the representation comprises semantic and syntactic relations between constituents in the text of the message.

36. The method of claim 33, the description is a word, sentence, phrase, or paragraph indicative of the intent.

37. A computer readable storage medium having stored thereon a data packet that when transmitted between two or more computer components facilitates at least one of the two or computer components to manage messages based upon intent, comprising:
    identifying one or more features of a message, wherein the message is received by a user from another user; utilizing the identified features to determine an intent of the message, the intent includes a confidence value of the accuracy of the determined intent; reformulating sentences of the message containing the intent to provide a description of the intent, wherein the description of the intent is a specific task assignment for the user; and automatically adding the specific task assignment to a task list of the user upon the confidence value exceeding a user specified threshold.

38. A computer readable medium storing computer executable components to facilitate handling data based on an associated intent, comprising:
    a component that receives data, wherein the data is a message sent to a user from another user;
    a component that determines intent of the data, wherein the intent includes a confidence value of the accuracy of the determined intent;
    a component that reformulates at least a subset of the data based on the intent; and
    a component that provides the reformulated data to the user in a user interface; and
    a component that upon the determined intent being a specific task assignment for the user and the confidence value exceeding a dynamically generated threshold automatically adds the specific task assignment to a task list of the user, wherein the threshold is dynamically generated based upon at least an inferred current state of the user based upon observation of the user.

39. A data handling system, comprising:
    means for determining a language based meaning of received data, wherein the data is a message sent to a user from another user, wherein the meaning-includes a confidence level of the accuracy of the determined meaning;
    means for reformulating the data to produce a representation of the meaning , wherein the representation of the meaning is a single sentence representation of the meaning from a plurality of sentences in the message; and
    means for presenting the representation to the user upon the confidence level exceeding a user defined threshold.

* * * * *